(12) United States Patent
Leleannec et al.

(10) Patent No.: US 12,355,996 B2
(45) Date of Patent: *Jul. 8, 2025

(54) ENCODING AND DECODING METHODS AND CORRESPONDING DEVICES

(71) Applicant: InterDigital VC Holdings, Inc., Wilmington, DE (US)

(72) Inventors: Fabrice Leleannec, Cesson-Sevigne (FR); Tangi Poirier, Cesson-Sevigne (FR); Ya Chen, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 54 days.

This patent is subject to a terminal disclaimer.

(21) Appl. No.: 18/198,886

(22) Filed: May 18, 2023

(65) Prior Publication Data

US 2023/0291922 A1 Sep. 14, 2023

Related U.S. Application Data

(63) Continuation-in-part of application No. 16/766,361, filed as application No. PCT/US2018/059579 on Nov. 7, 2018, now Pat. No. 11,695,962.

(30) Foreign Application Priority Data

Nov. 23, 2017 (EP) .................................... 17306628

(51) Int. Cl.
*H04N 19/105* (2014.01)
*H04N 19/129* (2014.01)
(Continued)

(52) U.S. Cl.
CPC ........... *H04N 19/44* (2014.11); *H04N 19/176* (2014.11); *H04N 19/60* (2014.11); *H04N 19/70* (2014.11)

(58) Field of Classification Search
None
See application file for complete search history.

(56) References Cited

U.S. PATENT DOCUMENTS 9,124,872 B2 9/2015 Sole Rojals et al.
9,392,301 B2 7/2016 Sole Rojals et al.
(Continued)

FOREIGN PATENT DOCUMENTS

CN 102939755 A 2/2013
CN 103748886 A 4/2014
(Continued)

OTHER PUBLICATIONS

Chen, et al., "Algorithm Description of Joint Exploration Test Model 3", JVET-C1001_v1, Editors, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 35 pages.
(Continued)

*Primary Examiner* — Mikhail Itskovich
(74) *Attorney, Agent, or Firm* — Condo Roccia Koptiw LLP

(57) ABSTRACT

A decoding method is disclosed. First, context for a syntax element associated with a current transform coefficient of a block of a picture is determined. The context is determined based on the area of said block, on the position of the current transform coefficient within the block and on the number of non-zero neighboring transform coefficients in a local template. Second, the syntax element is decoded based at least on the determined context. Advantageously, the local template depends on the shape of said block.

26 Claims, 11 Drawing Sheets

(51) Int. Cl.
*H04N 19/176* (2014.01)
*H04N 19/44* (2014.01)
*H04N 19/46* (2014.01)
*H04N 19/60* (2014.01)
*H04N 19/70* (2014.01)

(56) References Cited

U.S. PATENT DOCUMENTS

| | | | |
|---|---|---|---|
| 2004/0013194 A1 | 1/2004 | Pichée et al. | |
| 2005/0123207 A1 | 6/2005 | Marpe et al. | |
| 2012/0230402 A1 | 9/2012 | Auyeung et al. | |
| 2013/0016789 A1 | 1/2013 | Lou et al. | |
| 2013/0051459 A1 | 2/2013 | Kirchhoffer et al. | |
| 2013/0251041 A1 | 9/2013 | Guo et al. | |
| 2013/0272379 A1 | 10/2013 | Karczewicz et al. | |
| 2013/0272423 A1 | 10/2013 | Karczewicz et al. | |
| 2014/0140400 A1 | 5/2014 | George et al. | |
| 2014/0198841 A1 | 7/2014 | George et al. | |
| 2014/0362925 A1 | 12/2014 | Nguyen et al. | |
| 2015/0172652 A1 | 6/2015 | Gamei et al. | |
| 2016/0353112 A1* | 12/2016 | Zhang | H04N 19/577 |
| 2017/0064336 A1 | 3/2017 | Zhang et al. | |
| 2017/0142448 A1 | 5/2017 | Karczewicz et al. | |

FOREIGN PATENT DOCUMENTS

| | | |
|---|---|---|
| CN | 105141966 A | 12/2015 |
| CN | 107302367 A | 10/2017 |
| CN | 107333141 A | 11/2017 |
| JP | 2004512785 A | 4/2004 |
| JP | 2008259224 A | 10/2008 |
| JP | 2013192118 A | 9/2013 |
| JP | 2015513291 A | 4/2015 |
| WO | 2011/128303 A2 | 10/2011 |
| WO | 2013102380 A1 | 7/2013 |
| WO | 2017/041271 A1 | 3/2017 |
| WO | 2017/041676 A1 | 3/2017 |
| WO | 2018065250 A1 | 4/2018 |

OTHER PUBLICATIONS

ITU-T, "High Efficiency Video Coding", H.265-v2, Series H: Audiovisual and Multimedia Systems, Infrastructure of Audiovisual Services—Coding of Moving Video, Oct. 2014, 540 pages.

Sullivan, et al., "Overview of the High Efficiency Video Coding (HEVC) Standard", IEEE Transactions on Circuits and Systems for Video Technology, vol. 22, No. 12, Dec. 2012, pp. 1649-1668.

Zheng, et al., "CE11: Mode Dependent Coefficient Scanning", JCT-VC of ITU-T SG16 WP3 and ISO/IEC JTC1/SC29.WG11; 4th Meeting: Daegu, KR; JCTVC-D393, Jan. 20-28, 2011, 6 pages.

* cited by examiner

ENCODING AND DECODING METHODS AND CORRESPONDING DEVICES

CROSS REFERENCE TO RELATED APPLICATIONS

This application is a continuation of U.S. patent application Ser. No. 16/766,361 (now U.S. Pat. No. 11,695,962), which is the National Stage Entry under 35 U.S.C. § 371 of Patent Cooperation Treaty Application No. PCT/US2018/059579, filed Nov. 7, 2018, which was published in accordance with PCT Article 21(2) on May 31, 2019, in English, and which claims the benefit of European Patent Application No. 17306628.3, filed Nov. 23, 2017, the disclosures of each of which are incorporated by reference herein in their entireties.

TECHNICAL FIELD

At least one of the present embodiments generally relates to a method and a device for picture encoding and decoding, and more particularly, to entropy coding and decoding of transform coefficients.

BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. During encoding the original picture block is usually partitioned split into sub-blocks possibly using quad-tree partitioning. To reconstruct the video, the compressed data is decoded by inverse processes corresponding to the prediction, transform, quantization and entropy coding.

BRIEF SUMMARY

A decoding method is disclosed that comprises:
determining a context for a syntax element associated with a current transform coefficient of a block of a picture based on the area of said block, on the position of the current transform coefficient within the block and on the number of non-zero neighboring transform coefficients in a local template; and
decoding said syntax element based at least on the determined context;
wherein the local template depends on the shape of said block.

An encoding method is disclosed that comprises:
determining a context for a syntax element associated with a current transform coefficient of a block of a picture based on the area of said block, on the position of the current transform coefficient within the block and on the number of non-zero neighboring transform coefficients in a local template; and
encoding said syntax element based at least on the determined context;
wherein the local template depends on the shape of said block.

A stream is disclosed that is formatted to include encoded data representative of a block of a picture, the encoded data encoded according to the above encoding method. A computer-readable storage medium is disclosed that carries the stream.

A computer-readable storage medium is disclosed that carries a software program including program code instructions for the above encoding and decoding methods according to the various embodiments.

A computer program is disclosed that comprises software code instructions for performing the encoding and decoding methods according to the various embodiments when the computer program is executed by a processor.

A decoding device is disclosed that comprises:
means for determining a context for a syntax element associated with a current transform coefficient of a block of a picture based on the area of said block, on the position of the current transform coefficient within the block and on the number of non-zero neighboring transform coefficients in a local template; and
means for decoding said syntax element based at least on the determined context;
wherein the local template depends on the shape of said block.

A decoding device is disclosed that comprises a communication interface configured to access at least a stream and at least one processor configured to:
determine a context for a syntax element associated with a current transform coefficient of a block of a picture based on the area of said block, on the position of the current transform coefficient within the block and on the number of non-zero neighboring transform coefficients in a local template; and
decode said syntax element from the accessed stream based at least on the determined context;
wherein the local template depends on the shape of said block.

An encoding device is disclosed that comprises:
means for determining a context for a syntax element associated with a current transform coefficient of a block of a picture based on the area of said block, on the position of the current transform coefficient within the block and on the number of non-zero neighboring transform coefficients in a local template; and
means for encoding said syntax element based at least on the determined context;
wherein the local template depends on the shape of said block.

An encoding device is disclosed that comprises a communication interface configured to access a block of a picture and at least one processor configured to:
determine a context for a syntax element associated with a current transform coefficient of the accessed block based on the area of said block, on the position of the current transform coefficient within the block and on the number of non-zero neighboring transform coefficients in a local template; and
encode said syntax element based at least on the determined context;
wherein the local template depends on the shape of said block.

The following embodiments apply to the decoding method, decoding devices encoding method, encoding devices, computer program, computer-readable storage medium and stream disclosed above Advantageously, said local template comprises more neighboring transform coefficients along a direction of a longest dimension of the block.

In a specific embodiment, the local template comprises a plurality of neighboring transform coefficients of the current block, wherein said plurality of neighboring transform coefficients and said current transform coefficient form a horizontal rectangle in the case where said current block is a horizontal rectangle and form a vertical rectangle in the case where said current block is vertical rectangle.

In a specific embodiment, said context is further determined based on a scan pattern of said block.

As an example, the local template comprises a plurality of neighboring transform coefficients of the current block, wherein said plurality of neighboring transform coefficients and said current transform coefficient form a horizontal rectangle in the case where said scan pattern is horizontal and form a vertical rectangle in the case where said scan pattern is vertical.

Advantageously, said syntax element determines at least one of whether said transform coefficient is non-zero (e.g. significant flag), whether said transform coefficient is greater than one and whether said transform coefficient is greater than two.

DETAILED DESCRIPTION

It is to be understood that the figures and descriptions have been simplified to illustrate elements that are relevant for a clear understanding of the present embodiments, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another A picture is an array of luma samples in monochrome format or an array of luma samples and two corresponding arrays of chroma samples (or three arrays of tri-chromatic color samples such as RGB) in 4:2:0, 4:2:2, and 4:4:4 colour format. Generally, a "block" addresses a specific area in a sample array (e.g., luma Y), and a "unit" includes the collocated block of all color components (luma Y and possibly chroma Cb and chroma Cr) A slice is an integer number of basic coding units such as HEVC coding tree units or H.264 macroblock units. A slice may consist of a complete picture as well as part thereof. Each slice may include one or more slice segments.

In the following, the word "reconstructed" and "decoded" can be used interchangeably. Usually but not necessarily "reconstructed" is used on the encoder side while "decoded" is used on the decoder side. It should be noted that the term "decoded" or "reconstructed" may mean that a bitstream is partially "decoded" or "reconstructed," for example, the signals obtained after deblocking filtering but before SAO filtering, and the reconstructed samples may be different from the final decoded output that is used for display. We may also use the terms "image," "picture," and "frame" interchangeably.

Figure 1:
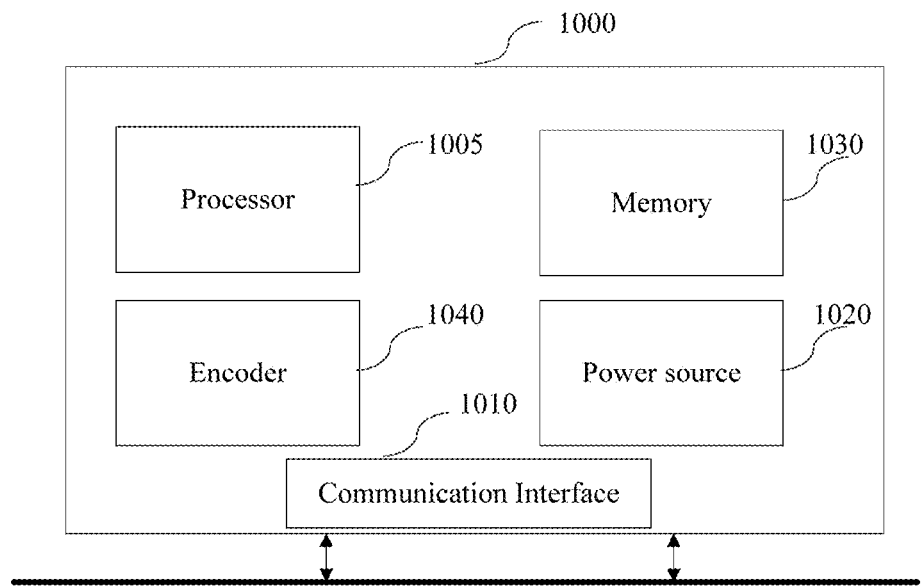
FIG. 1 illustrates an exemplary architecture of a transmitter configured to encode a picture in a bitstream according to a specific and non-limiting embodiment.

Various embodiments are described with respect to the HEVC standard. However, the present embodiments are not limited to HEVC, and can be applied to other standards, recommendations, and extensions thereof, including for example HEVC or HEVC extensions like Format Range (RExt), Scalability (SHVC), Multi-View (MV-HEVC) Extensions and H.266. The various embodiments are described with respect to the encoding/decoding of a slice. They may be applied to encode decode a whole picture or a whole sequence of pictures Various methods are described above, and each of the methods comprises one or more steps or actions for achieving the described method. Unless a specific order of steps or actions is required for proper operation of the method, the order and/or use of specific steps and/or actions may be modified or combined FIG. 1 represents an exemplary architecture of a transmitter 1000 configured to encode a picture in a bitstream according to a specific and non-limiting embodiment.

The transmitter 1000 comprises one or more processor(s) 1005, which could comprise, for example, a CPU, a GPU and/or a DSP (English acronym of Digital Signal Processor), along with internal memory 1030 (e.g. RAM, ROM, and/or EPROM). The transmitter 1000 comprises one or more communication interface(s) 1010 (e.g. a keyboard, a mouse, a touchpad, a webcam), each adapted to display output information and/or allow a user to enter commands and/or data; and a power source 1020 which may be external to the transmitter 1000 The transmitter 1000 may also comprise one or more network interface(s) (not shown). Encoder module 1040 represents the module that may be included in a device to perform the coding functions. Additionally, encoder module 1040 may be implemented as a separate element of the transmitter 1000 or may be incorporated within processor(s) 1005 as a combination of hardware and software as known to those skilled in the art.

The picture may be obtained from a source. According to different embodiments, the source can be, but is not limited to:
  a local memory. e.g. a video memory, a RAM, a flash memory, a hard disk;
  a storage interface, e.g. an interface with a mass storage, a ROM, an optical disc or a magnetic support;
  a communication interface, e.g. a wireline interface (for example a bus interface, a wide area network interface, a local area network interface) or a wireless interface (such as a IEEE 802.11 interface or a Bluetooth interface); and
  a picture capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface. e.g. an interface to a point to point link, a communication bus, a point to multipoint link or a broadcast network. According to an exemplary and non-limiting embodiment, the transmitter 1000 further comprises a computer program stored in the memory 1030. The computer program comprises instructions which, when executed by the transmitter 1000, in particular by the processor 1005, enable the transmitter 1000 to execute the encoding method described with reference to any one of FIGS. 8-10, 14 and 16. According to a variant, the computer program is stored externally to the transmitter 1000 on a non-transitory digital data support, e.g. on an external storage medium such as a HDD, CD-ROM, DVD, a read-only and/or DVD drive and/or a DVD Read, Write drive, all known in the art. The transmitter 1000 thus comprises a mechanism to read the computer program. Further, the transmitter 1000 could access one or more Universal Serial Bus (USB)-type storage devices (e.g., "memory sticks.") through corresponding USB ports (not shown).

According to exemplary and non-limiting embodiments, the transmitter 1000 can be, but is not limited to:
  a mobile device;
  a communication device;
  a game device;
  a tablet (or tablet computer);
  a laptop;
  a still picture camera;
  a video camera;
  an encoding chip or encoding device/apparatus;
  a still picture server; and
  a video server (e.g. a broadcast server, a video-on-demand server or a web server).

Figure 2:
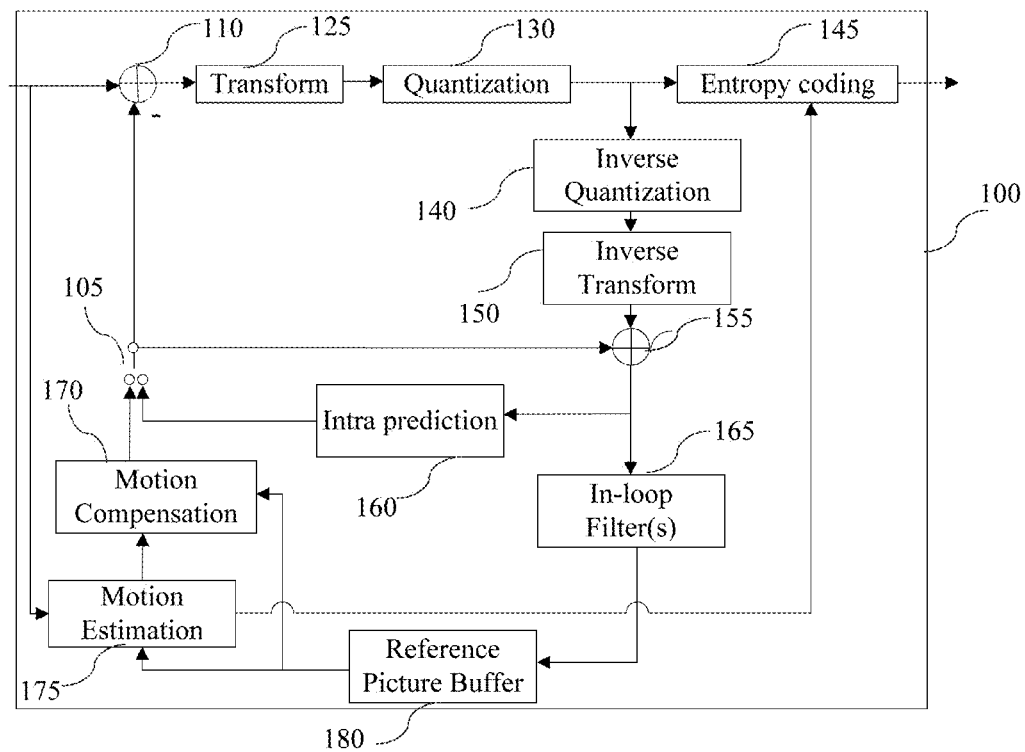
FIG. 2 illustrates an exemplary video encoder adapted to execute the encoding method of any one of FIGS. 8-10, 14 and 16.

FIG. 2 illustrates an exemplary video encoder 100, e.g. of HEVC type, adapted to execute the encoding method of any one of FIGS. 8-10, 14 and 16. The encoder 100 is an example of a transmitter 1000 or part of such a transmitter 1000.

For coding, a picture is usually partitioned into basic coding units, e.g. into coding tree units (CTU) in HEVC or into macroblock units in H.264. A set of possibly consecutive basic coding units is grouped into a slice. A basic coding unit contains the basic coding blocks of all color components. In HEVC, the smallest coding tree block (CTB) size 16×16 corresponds to a macroblock size as used in previous video coding standards. It will be understood that, although the terms CTU and CTB are used herein to describe encoding/decoding methods and encoding decoding apparatus, these methods and apparatus should not be limited by these specific terms that may be worded differently (e.g. macroblock) in other standards such as H.264.

In HEVC coding, a picture is partitioned into CTUs of square shape with a configurable size typically 64×64, 128×128, or 256×256. A CTU is the root of a quad-tree partitioning into 4 square Coding Units (CU) of equal size, i.e. half of the patent block size in width and height. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB. PB and TB of the luma component applies to the corresponding CU. PU and TU. A TB is a block of samples on which a same transform is applied. A PB is a block of samples on which a same prediction is applied.

In more recent encoding systems, a CTU is the root of a coding tree partitioning into Coding Units (CU). A coding tree is a tree in which a parent node (usually corresponding to a CU) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node. e.g. a CTU. A leaf of the coding tree is a terminating node of the tree. Each node of the coding tree represents a CU that may be further split into smaller CUs also named sub-CUs or more generally sub-blocks Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure. There is no partitioning of a CB into PBs and TBs. i.e. a CU is made of a single PU and a single TU.

Figure 3:
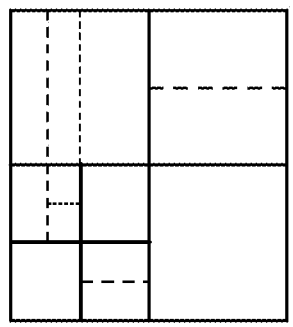
FIG. 3 illustrates a partitioning of a coding tree unit into coding units where coding units can be split both according to quad-tree and binary tree symmetric split modes according to the prior art.
Figure 4:
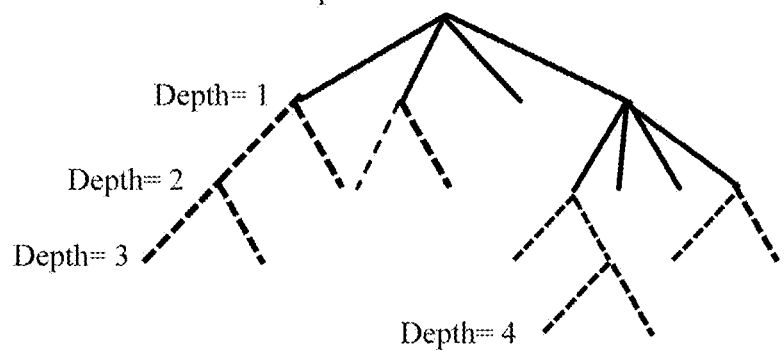
FIG. 4 illustrates the coding tree associated with the partitioning of the coding tree unit represented on FIG. 3.
Figure 5:
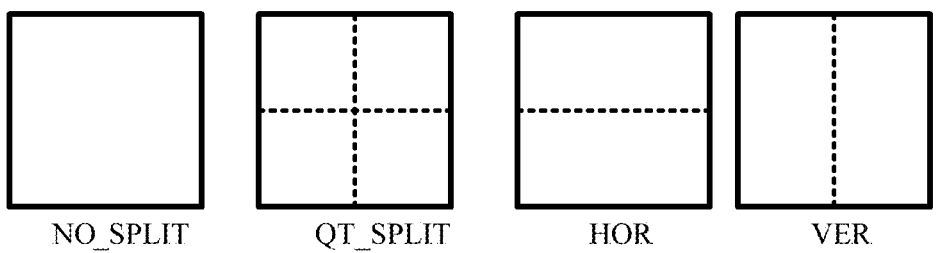
FIG. 5 illustrates quad-tree and symmetric binary tree split modes according to the prior art.

Binary tree symmetric split modes are defined to allow a CU to be split horizontally or vertically into two coding units of equal size. FIG. 3 represents a partitioning of a CTU into CUs where coding units can be split both according to quad-tree and binary tree symmetric split modes. On FIG. 3 solid lines indicate quad-tree partitioning and dotted lines indicate binary splitting of a CU into symmetric CUs. FIG. 4 represents the associated coding tree. On FIG. 4, solid lines represent the quad-tree splitting and dotted lines represent the binary splitting that is spatially embedded in the quad-tree leaves. FIG. 5 depicts the 4 split modes used in FIG. 3. The mode NO_SPLIT indicates that the CO is not further split. The mode QT_SPLIT indicates that the CU is split into 4 quadrants according to a quad-tree, the quadrants being separated by two split lines. The mode HOR indicates that the CU is split horizontally into two CUs of equal size separated by one split line VER indicates that 20 the CU is split vertically into two CUs of equal size separated by one split line. The split lines are represented by dashed lines on FIG. 5.

Figure 6:
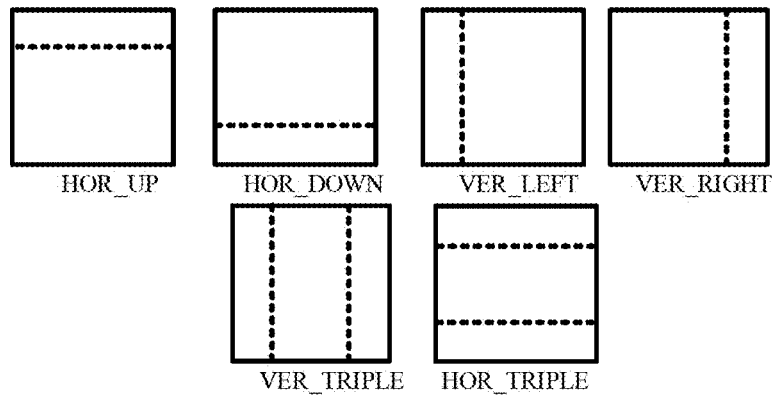
FIG. 6 illustrates asymmetric binary tree split modes and symmetric triple tree split modes according to a specific and non-limiting embodiment.

Binary tree asymmetric split modes are defined to allow a CU to be split horizontally into two coding units with respective rectangular sizes (w,h/4) and (w,3h/4) or vertically into two coding units with respective rectangular sizes (w/4,h) and (3w/4,h)) as depicted on FIG. 6. The two coding units are separated by one split line represented by a dashed line on FIG. 6.

FIG. 6 also illustrates triple tree split modes according to which a coding unit is split into three coding units in both vertical and horizontal directions. In horizontal direction, a CU is split into three coding units of respective sizes (w, h/4), (w,h/2) and (w, h/4). In vertical direction, a CU is split into three coding units of respective sizes (w/4, h), (w/2, h) and (w/4, h).

In the following, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

Back to FIG. 2, in the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Residuals are calculated by subtracting (110) a predicted sample block (also known as a predictor) from the original picture block.

CUs in intra mode are predicted from reconstructed neighboring samples, e.g. within the same slice. A set of 35 intra prediction modes is available in HEVC, including a DC, a planar, and 33 angular prediction modes. The intra prediction reference may thus be reconstructed from the row and column adjacent to the current block. CUs in inter mode are predicted from reconstructed samples of a reference picture stored in a reference picture buffer (180).

The residuals are transformed (125) and quantized (130). The quantized transform coefficients, as well as motion vectors and other syntax elements, are entropy coded (145) to output a bitstream.

The entropy coding may be, e.g., Context Adaptive Binary Arithmetic Coding (CABAC), Context Adaptive Variable Length Coding (CAVLC), Huffman, arithmetic, exp-Golomb, etc. CABAC is a method of entropy coding first introduced in H.264 and also used in HEVC. CABAC involves binarization, context modeling and binary arithmetic coding. Binarization maps the syntax elements to binary symbols (bins). Context modeling determines the probability of each regularly coded bin (i.e non-bypassed) based on some specific context. Finally, binary arithmetic coding compresses the bins to bits according to the determined probability.

Binarization defines a unique mapping of syntax element values to sequences of bins. Several binarization processes may be used such as unary, truncated unary, k-th order Ext-Golomb and fixed-length binarization. The binarization process may be selected based on the type of syntax element and in some cases also based on the value of a previously processed syntax element. In the regular coding mode (as opposed to the bypass coding mode), each bin value is then encoded by using a probability model which may be determined by a fixed choice based on the type of syntax element and the bin position or adaptively chosen from a plurality of probability models depending on side information (e.g depth/size of a block, position within a TU, etc).

Context modeling provides an accurate probability estimate required to achieve high coding efficiency. Accordingly, it is highly adaptive and different context models can be used for different bins and the probability of that context model is updated based on the values of the previously coded bins. Selection of the probability model is referred to as context modeling. In the bypass coding mode, a fixed probability model is applied with equal probability for both bin values '0' and '1' The bypass coding mode in H.264 was mainly used for signs and least significant bins of absolute values of quantized coefficients. In HEVC the majority of possible bin values is handled by the bypass coding mode.

Arithmetic coding is based on recursive interval division. A range, with an initial value of 0 to 1, is divided into two subintervals based on the probability of the bin. The encoded bits provide an offset that, when converted to a binary fraction, selects one of the two subintervals, which indicates the value of the decoded bin. After every decoded bin, the range is updated to equal the selected subinterval, and the interval division process repeats itself. The range and offset have limited bit precision, so renormalization is required whenever the range falls below a certain value to prevent underflow: Renormalization can occur after each bin is decoded. Arithmetic coding can be done using an estimated probability (context based encoding), or assuming equal probability of 0.5 (bypass coding mode).

The encoder may also skip the transform or bypass both transform and quantization, i.e., the residual is coded directly without the application of the transform or quantization processes. The encoder further comprises a decoding loop and thus decodes an encoded block to provide a reference for further predictions. The quantized transform coefficients are de-quantized (140) and inverse transformed (150) to decode residuals. In the following quantized transform coefficients are called coefficients. A picture block is reconstructed by combining (155) the decoded residuals and the predicted sample block. An in-loop filter (165) may be applied to the reconstructed picture, for example, to perform deblocking/SAO (Sample Adaptive Offset) filtering to reduce coding artifacts. The filtered picture may be stored in a reference picture buffer (180) and used as reference for other pictures.

Figure 7:
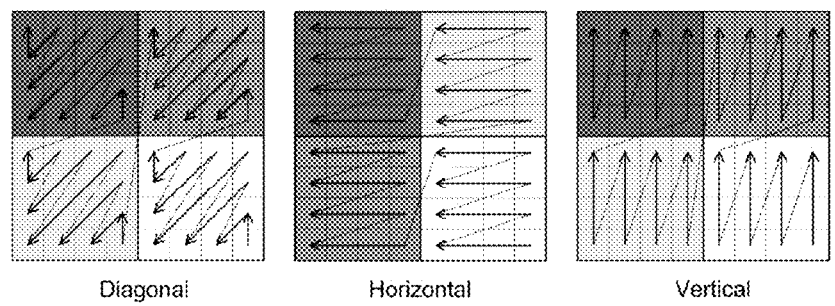
FIG. 7 depicts a 16×16 transform block divided into 4×4 sub-blocks of coefficients.

FIG. 7 depicts a 16×16 TB, i.e. a 16×16 block of samples on which a same transform is applied, divided into 4×4 sub-blocks of coefficients also called Coding Groups (CG). The entropy coding/decoding is made of several scanning passes, which scan the TB according to a scan pattern selected among several possible scan patterns, e.g., diagonal, horizontal and vertical.

Coefficient coding may involve five main steps: scanning, last significant coefficient coding, significance map coding, coefficient level coding and sign data coding. The five main steps correspond to the different types of processing used to encode the samples of a transform block. Scanning corresponds to a loop over the CG according to a given CG scanning order starting at the last significant coefficient, and a loop on coefficients inside each CG according to a coefficient scanning order. The last significant coefficient position is the position (X,Y) of the last non-zero coefficient in the TB.

The significance map is the coded information that allows the decoder to identify the position of non-zero coefficients in the TB. The information includes a significant flag of a CG (called coded_sub_block_flag in HEVC) and significant flags of coefficients in the CG (called sig_coeff_flag in HEVC). The CG significant flag indicates if all coefficients in the CG are zero or not. If the CG significant flag is equal to zero, then all coefficients in this CG are equal to zero, and the significant coefficient flags are not signaled for the coefficients contained in this CG; otherwise they are signaled (coded). The significant flag of a coefficient indicates whether this coefficient is non-zero. Coefficient level coding corresponds to coding the magnitude of a transform coefficient. Sign data coding corresponds to coding the sign of a transform coefficient. For inter blocks, the diagonal scanning on the left of FIG. 7 may be used, while for 4×4 and 8×8 intra block, the scanning order may depend on the intra Prediction mode active for that block.

A scan pass over a TB thus consists in processing each CG sequentially according to one of the scanning orders (diagonal, horizontal, vertical), and the 16 coefficients inside each CG are scanned according to the considered scanning order as well. The scan pass over a TB starts at the last significant coefficient in the TB, and processes all coefficients until the DC coefficient (top left coefficient in the TB of FIG. 7).

The last significant coefficient in the TB is signaled by encoding its coordinates. In HEVC, the following syntax elements are encoded: last significant coefficient prefix in the x direction or axis (last_sig_coeff_x_prefix), last significant coefficient prefix in the y direction (last_sig_coeff_y_prefix), last significant coefficient suffix in the x direction (last_sig_coeff_x_suffix), and last significant coefficient suffix in the y direction (last_sig_coeff_y_suffix), which provides the decoder with the spatial position (x- and y-coordinates) of the last non-zero coefficients in the whole TB. The y direction or axis may be the vertical direction and the x direction or axis may be the horizontal direction. The opposite may also hold true. As an example, for a square TB of size 32×32, and a last significant coefficient of coordinates (x=6, y=9), the coordinates are binarized in 2 parts: a prefix and a suffix. The prefix represents an interval, which is related to the size of the TB. When the TB's size, denoted T, is equal to 32, the number N of intervals is equal to 10 (N=2 log 2(T)). It has a truncated unary representation, and bins are coded in regular mode. For x, the value is in the 6th interval, so its prefix is 111110: while for y, it's in 7th interval, so its prefix is 1111110.

The suffix represents the offset within the interval. It has a fixed length representation, and bins are coded in bypass mode. In the 6th interval, we have 2 offsets, for the value of x=6, the suffix is 0 (if value=7, the suffix is 1). In the 7th interval, there are 3 offsets, for y=9, the suffix is 01. Therefore, x is represented by 1111100 and y by 111111001.

Then for each successive CG starting with the CG containing the last significant coefficient in the TB to the top-left CG in the TB, the following steps apply for a current CG First, the current CG significant flag (coded_sub_block_flag in HEVC) is encoded. Second, coefficient level information for the coefficients in the current CG is encoded using up to five scan passes, respectively dedicated to the coding of each syntax element in the following list:

Significant coefficient flag (e.g sig_coeff_flag): significance of a coefficient (zero/non-zero);

Coefficient absolute level greater than one flag coeff_abs_level_greater1_flag): indicates if the absolute value of a coefficient level is greater than 1;

Coefficient absolute level greater than two flag (e.g coeff_abs_level_greater2_flag): indicates if the absolute value of a coefficient level is greater than 2;

Coefficient sign flag (e.g. coeff_sign_flag): sign of a significant coefficient level (e.g. 0: positive, 1: negative, the opposite may also hold true);

Coefficient absolute level remaining (e.g. coeff_abs_level_remaining): remaining absolute value of a coefficient level. The magnitude of a transform coefficient to code/decode is always a positive integer value. The coefficient absolute level remaining corresponds to the absolute value of the coefficient minus 3 (if it is known the coefficient is greater than 2).

In each scan pass, a syntax element is coded only when necessary as determined by the previous scan passes. For example, if a coefficient is not significant, the remaining scan passes are not necessary for that coefficient. The same is performed for the sign coding: the coefficient sign flag is sent only for non-zero coefficients.

Figure 8:
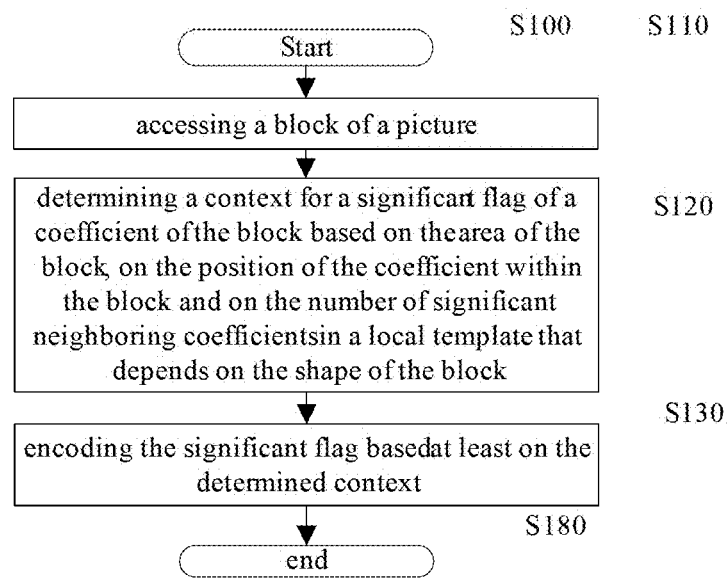
FIGS. 8 and 9 illustrate flowcharts of a method for encoding a significant coefficient flag in a bitstream according to specific and non-limiting embodiments.

FIG. 8 represents a flowchart of a method for encoding a significant coefficient flag in a bitstream according to a specific and non-limiting embodiment. The method starts at step S100. At step S110, a transmitter 1000, e.g. such as the encoder 100, accesses a block of a picture. At step S120, the transmitter determines a context for a significant flag of a coefficient of a block based on the area of the block, on the position of the coefficient within the block and on the number of significant, i.e. non-zero, neighboring coefficients in a local template wherein the local template depends on the shape of said block. At step S130, the transmitter encodes the significant flag based on the determined context. The method ends at step S180.

Figure 9:
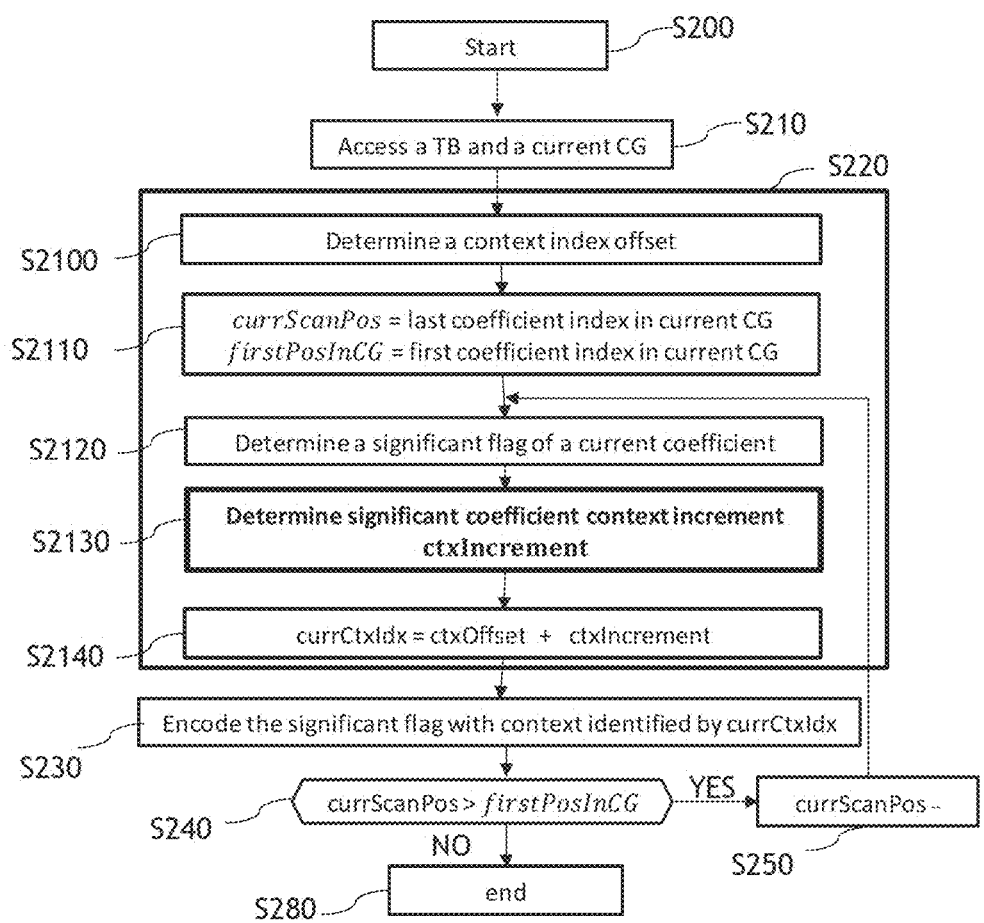

FIG. 9 illustrates a flowchart of an exemplary method for encoding a significant coefficient flag in accordance with an embodiment.

The method starts at step S200. At step S210, a transmitter 1000, e.g. such as the encoder 100, accesses a TB and a current coding group currCG in the accessed TB. The size of the TB is defined by values width and height.

At step S220, the transmitter determines a context for a significant flag of a coefficient of currCG. The context is identified by an index currCtxIdx. Thus, determining a context comprises determining the index currCtxIdx identifying the context in a set of contexts.

In step S2100, a context index offset ctxOffset is determined, ctxOffset is equal to 54 if the TB is of Chroma component, and is equal to indexOnTBSize if the TB is not Chroma (i.e., if the TB is a Luma block). The determination of index OnTBSize depends on the TB size, more precisely, on the TB area. The following value is calculated:

$$ui \; \text{Log 2BlkSize} = \log 2(\text{width} * \text{height}) \gg 1 = (\log 2(\text{width}) + \log 2(\text{height})) \gg 1 \qquad (1)$$

where $\gg$ is a right-shift operator.

If the current TB is a Luma block, then the contexts that are used to code the significant coefficient flag are determined as a function of this value ui Log 2BlkSize.

$$\text{indexOnTbSize}=ui \log 2 \text{ BlkSize} \leq 2?0: f(ui \log 2\text{Blk-Size}) \quad (2)$$

Where f( ) is a defined function, e.g. in the form of a Look-Up Table and (a<b?i:j) means that if a<b, then the result is i and otherwise the result is j. As an example, $$f(ui\text{Log2BlkSize}) = \begin{cases} 18 & \text{if } (ui\text{Log2BlkSize} = 3) \\ 36 & \text{if } (ui\text{Log2BlkSize} \geq 4) \end{cases} \quad (3)$$

As a result, separated sets of contexts (e.g., CABAC contexts) are employed to code the significant coefficient flag of TB with different areas for Luma components. These different sets of contexts are represented by the context offset (etxOffset), which is an address in a global set of contexts useful for the coding of the significant coefficient flag.

Step S2110 initializes the current scan position (currScanPos) and the first position in the current CG (firstPosInCG), that is, the last coefficient index and the first coefficient index in the current CG, respectively, since the scan proceeds from last to first coefficient in the current CG, as in FIG. 7.

Steps S2120 to S240 of the coding method of FIG. 9 consist in a loop over each coefficient in the current CG of the current TB, from the last coefficient towards the lowest frequency coefficient. Step S2120 determines the significant coefficient flag or significance (also, sig_coeff_flag) as variable uiSig, which is 1 if the coefficient in the currScanPos is non-zero, and 0 otherwise. Then, step S2130 determines the significant coefficient flag context increment (ctxIncrement). This step is detailed in FIG. 10. For each coefficient, a context index (currCtxidx) for the coding of its significance is computed at step S2140, as a function of the context offset (ctxOffset) and the context increment (cix Increment). In one embodiment, the function may be an addition, as in step S2140, or another linear or nonlinear function. Once the context index currCtxIdx for the current coefficient (defined by currScanPos) is obtained, its significance bin, represented by variable uiSig is entropy encoded (e.g., CABAC encoded) in step S230 based on the context identified by currCtxIdx. In step S240, the method checks whether currScanPos is larger than firstPosInCG. If the check in step S240 is true, the method decrements currScanPos by 1 in step S250 and returns to step S2120. If the check in step S240 is false, the method ends in step S280. The method is over once the loop reaches the coefficient with lowest frequency (or DC coefficient) in the current CG, that is, the top left coefficient in FIG. 7, represented by firstPosInCG.

Figure 10:
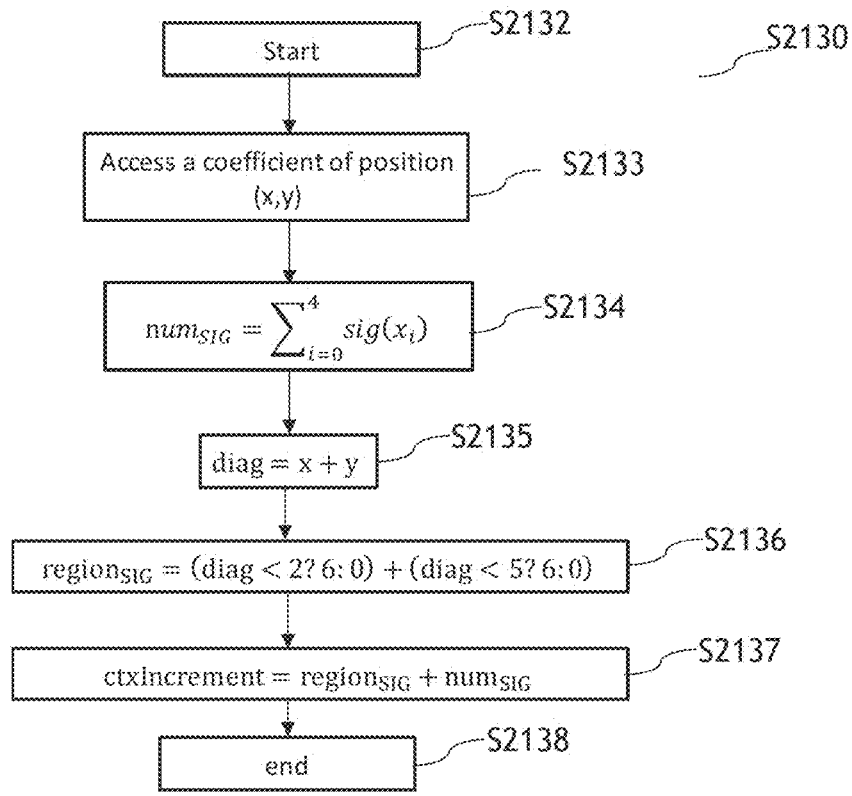
FIG. 10 illustrates a flowchart of a method for determining a significant coefficient flag context increment in accordance with a specific and non-limiting embodiment.

FIG. 10 illustrates a flowchart of a method for determining the significant coefficient flag context increment (corresponding to step S2130 of FIG. 9) for a current coefficient x in accordance with a specific and non-limiting embodiment.

Figure 11:
FIG. 11 depicts rectangular transform blocks divided into three regions.
Figure 11:
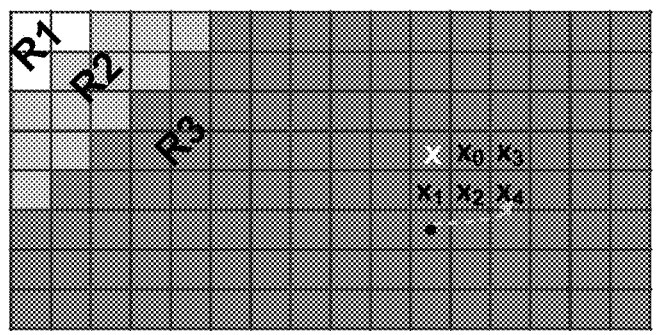

To capture the characteristics of coefficients at different frequencies, one TB is split into up to three context regions (R1, R2 and R3) identified with different colors as illustrated in FIG. 11. The context increments ctxIncrement assigned to each region are for example as follows: 12-17 for region R1, 6-11 for region R2 and 0-5 for region R3.

The context increment associated with the coefficient x in a block such as for example the rectangular blocks of FIG. 11 is determined by steps S2132 to S2138 of FIG. 10. The method starts at step S2132. At step S2133, the method accesses a coefficient x in a TB. At step S2134, the number of significant coefficients in a neighborhood of x covered by a local template is determined as follows:

$$\text{num}_{SIG}=\Sigma_{i=0}^{4}\text{sig}(x_i) \quad (4)$$

where $\text{sig}(x_i)$ is the significance or significant coefficient flag of coefficient $x_i$ in the local template.

At step S2135, the index of the diagonal to which coefficient x belongs to is computed as the sum of its coordinates:

$$\text{diag}=x+y \quad (5)$$

where x and y are the coordinates of the coefficient.

At step S2136, the region to which the coefficient x belongs is identified by comparing diag with defined values:

$$\text{region}_{SIG}=(\text{diag}<2?6:0)+(\text{diag}<5?6:0) \quad (6)$$

diag is thus compared against values 2 and 5, and values of 6 or 0 are assigned to the comparisons depending on whether or not diag is smaller than the respective values. Therefore, if the coefficient x belongs to the region R1, then $\text{region}_{SIG}$=12. If the coefficient x belongs to the region R2, then $\text{region}_{SIG}$=6 and if the coefficient \ belongs to the region R3, then $\text{region}_{SIG}$=0.

Finally, at step S2137, the context increment for current coefficient x is computed as:

$$\text{ctxIncrement}=\text{region}_{SIG}+\text{num}_{SIG} \quad (7)$$

Luma and Chroma components are treated in a similar way but with separate sets of context models.

Figure 12:
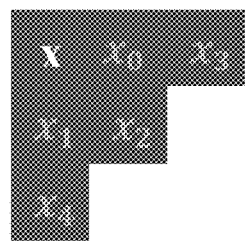
FIG. 12 depicts a local template used in encoding/decoding a significant coefficient flag according to the prior art.

The context increment determination depends on the values of the significant coefficient flag of previously coded coefficients in a neighborhood covered by a local template. More specifically, the context index is determined based on the sum of the significant coefficient flags of neighboring coefficients (each flag with a value of 0 or 1). FIG. 12 illustrates a local template used to assign CABAC contexts to each transform coefficient, when coding the significant flag of that coefficient in accordance with the prior art. This local template is symmetric and covers two available right neighboring coefficients (x0, x3), two bottom neighboring coefficients (x1, x4) and also one right-bottom neighboring coefficient (x2). Such local template is more appropriate for square TBs.

However, one knows that the magnitude of transform coefficients statistically decreases as a function of the frequency level associated with the coefficient. Moreover, the transform of a block may generally consist in a separable combination of two ID transforms, respectively in the vertical and the horizontal directions. Therefore, an efficient selection of the neighboring coefficients in the local template may depend on the block shape (more specifically in this case, the dimensions of the block).

According to an embodiment, the shape of a TB, e.g., the width and height of a rectangular TB, are taken into consideration in determining the local template for the assignment of context models (e.g., CABAC contexts) used to encode/decode the transform coefficient syntax elements, e.g., the significance information.

According to one embodiment, more neighboring coefficients are selected in the local template along a direction of a longest length of the TB, whether the longest length is width (x direction) or height (y direction).

Figure 13A:
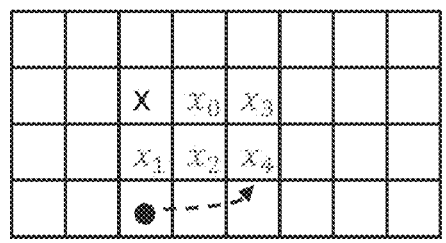
FIGS. 13A and 13B depict new local templates used in encoding/decoding a significant coefficient flag according to specific and non-limiting embodiments.
Figure 13A:
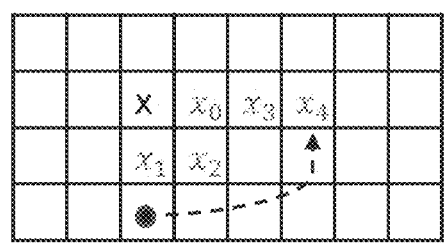
Figure 13B:
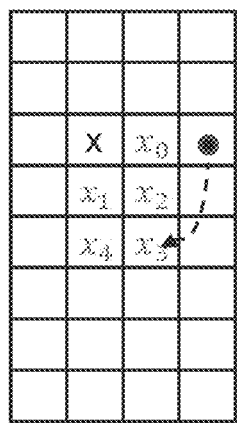
Figure 13B:
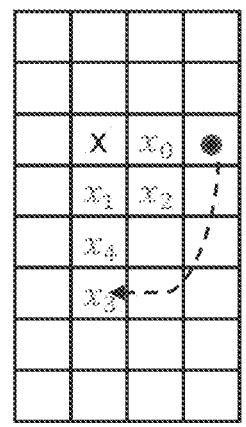

On FIG. 13A, new local templates are obtained by replacing the left-bottom neighbor identified by a black point (x4 on FIG. 12) with an adjacent neighbor along the longest direction, namely in the width direction in the case of a horizontal rectangular TB. On FIG. 13B, new local templates are obtained by replacing the right-top neighbor (x3 on FIG. 12) with an adjacent neighbor along the longest direction, namely the height in the case of a vertical rectangular TB. Indeed, it is likely that a higher number of significant coefficients exist along the direction (among width and height) that corresponds to the largest dimension among width and height of a rectangular TB. By modifying the local template as illustrated by FIGS. 13A and 13B, the parameter $num_{SIG}$ is adapted to the shape of the block.

According to a variant, the new local templates are used only for some block sizes. e.g. 4×16, 16×4, 8×32 and 32×8.

According to another variant, the new local templates are used only for some (e.g. 4×16, 16×4, 8×32 and 32×8) or all block sizes, for the coding of the coeff_abs_level_greater1_flag syntax element.

According to another variant, the new local templates are used only for some (e.g. 4×16, 16×4, 8×32 and 32×8) of all block sizes, for the coding of the coeff_abs_level_greater2_flag syntax element.

Figure 14:
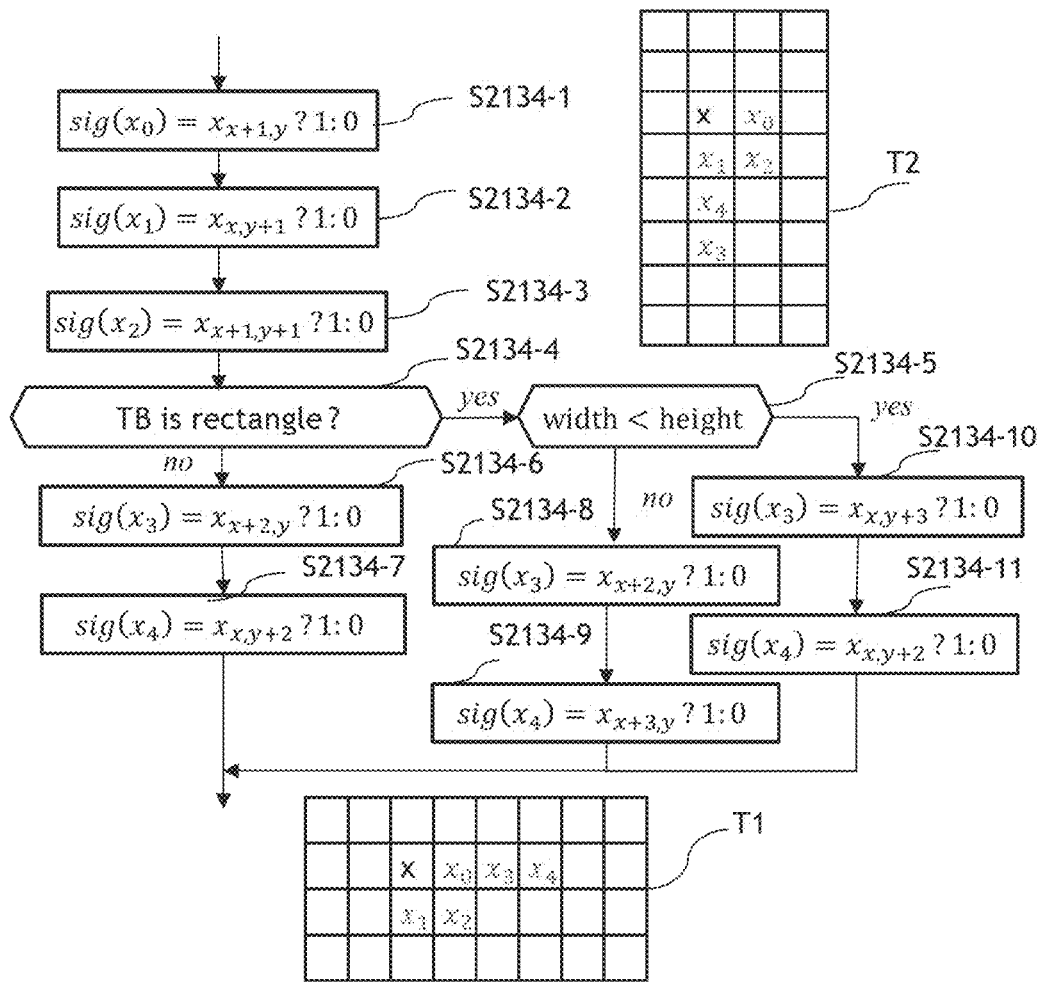
FIG. 14 illustrates the determination of a significant coefficient flag using the new local templates of FIGS. 13A and 13B.

FIG. 14 illustrates the determination of the significant coefficient flag sig ($x_i$) to be used in determining $num_{SIG}$ in the new local templates (i.e. T1 or T2) at step S2134 of FIG. 10.

The first three steps (S2134-1, S2134-2 and S2134-3) consist in determining the significance of the first three neighbors of current transform coefficient (x,y). As an example, in step S2134-1, $sig(x_0)=x_{x+1,y}$ ?1:0 means that in the case where the value ($x_{x+1,y}$) of the transform coefficient (x+1,y) is non-zero then $sig(x_0)$ is equal to 1 otherwise sig is equal to 0. The same process is applied to the other steps Next, the positions of the remaining neighbors of current coefficient (x,y) in the new local template is determined by the TB shape (S2134-4). In step S2134-4, it is checked whether the TB is a rectangle or not. If the TB is a rectangle, based on whether this TB is a horizontal rectangle or a vertical rectangle (S213 4-5), the positions of the remaining neighbors in the local template are adjusted related to the block shape (S2134-8 to S2134-11): otherwise (the TB is a square), the positions of the last two neighbors will still be (x,y+2) and (x,y+2) (S2134-6 and S2134-7).

In this exemplary embodiment, the adaption of the remaining neighbor positions is corresponding to the shortest dimension among the width and the height of the TB (S2134-5). If the width is the shorter dimension, the neighbors with position (x,y+2) and position (x,y+3) (S2134-10) and S213 4-11) are selected in the local template; otherwise, the neighbors with position are (x+2,y) and (x+3,y) (S2134-8 and S2134-9) are selected in the local template.

The local template may be adapted to other kind of TB shapes which may be different from a rectangle.

The local template of FIG. 12 is well-suited for the diagonal scan of FIG. 7. However, the significances of transform coefficients are related to the selected scanning order of TB. For intra coding, different intra prediction modes result in different residual statistics. For example, the magnitude of residual signal statistically decreases horizontally when horizontal prediction modes used. In addition, the significant coefficient flags still have higher consistency with the residual signal values, even though some correlations have been decreased by the transform process. Hence, the scan patters of transform coefficients depend on the intra prediction mode active for that block, which thereby minimizes the entropy cost on those trailing zero coefficients and improves the coding efficiency. Therefore, an efficient selection of the adjacent coefficients in the local template may also depend on the scan patterns.

According to another embodiment, the scan pattern of the current TB is taken into consideration in determining the local template for the assignment of context models (e.g., CABAC contexts) used to encode/decode the transform coefficient syntax elements. e.g., the significance information.

Figure 15A:
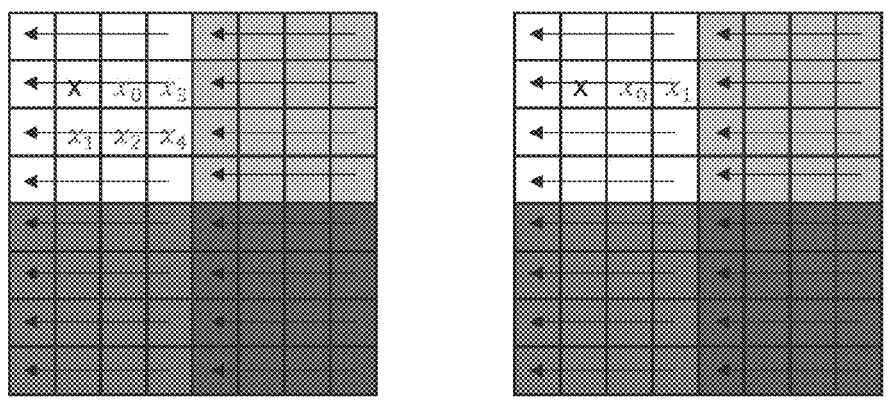
FIGS. 15A and 15B depict new local templates used in encoding/decoding a significant coefficient flag according to specific and non-limiting embodiments.

On FIG. 15A, new local templates are obtained that are adapted to a horizontal scan pattern. The new local template on the left of FIG. 15A is obtained by replacing the left-bottom neighbor with one available adjacent horizontal neighbor. On FIG. 15B, new local templates are obtained that are adapted to a vertical scan pattern. The new local template on the left of FIG. 15B is obtained by replacing the right-top neighbor with one available adjacent vertical neighbor, it is likely that a higher number of significant coefficients exist along the scanning direction, in the case of horizontal or vertical scanning order.

Figure 15B:
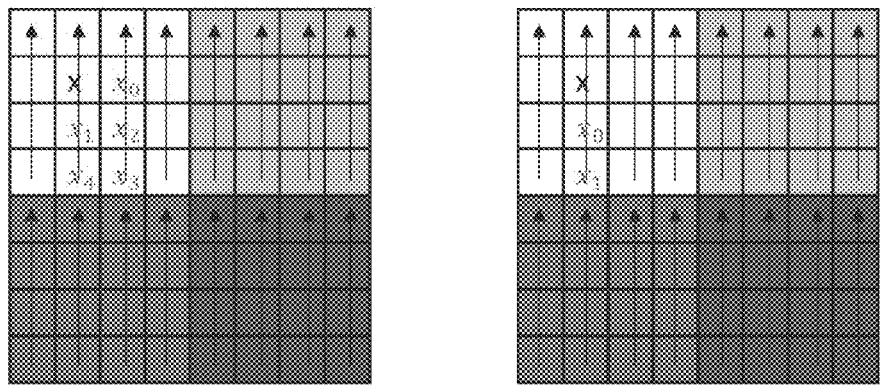

Due to the weaker correlation with the current significant coefficient, some adjacent neighbors can be removed from the local template to decrease the complexity as illustrated on the right of FIGS. 15A and 15B. By modifying the local template as illustrated by FIGS. 15A and 15B, the parameter $num_{SIG}$ is adapted to the scan pattern of the block.

According to another variant, the new local templates are used for the coding of the coeff_abs_level_greater1_flag syntax element.

According to another variant, the new local templates are used for the coding of the coeff_abs_level_greater2_flag syntax element.

Figure 16:
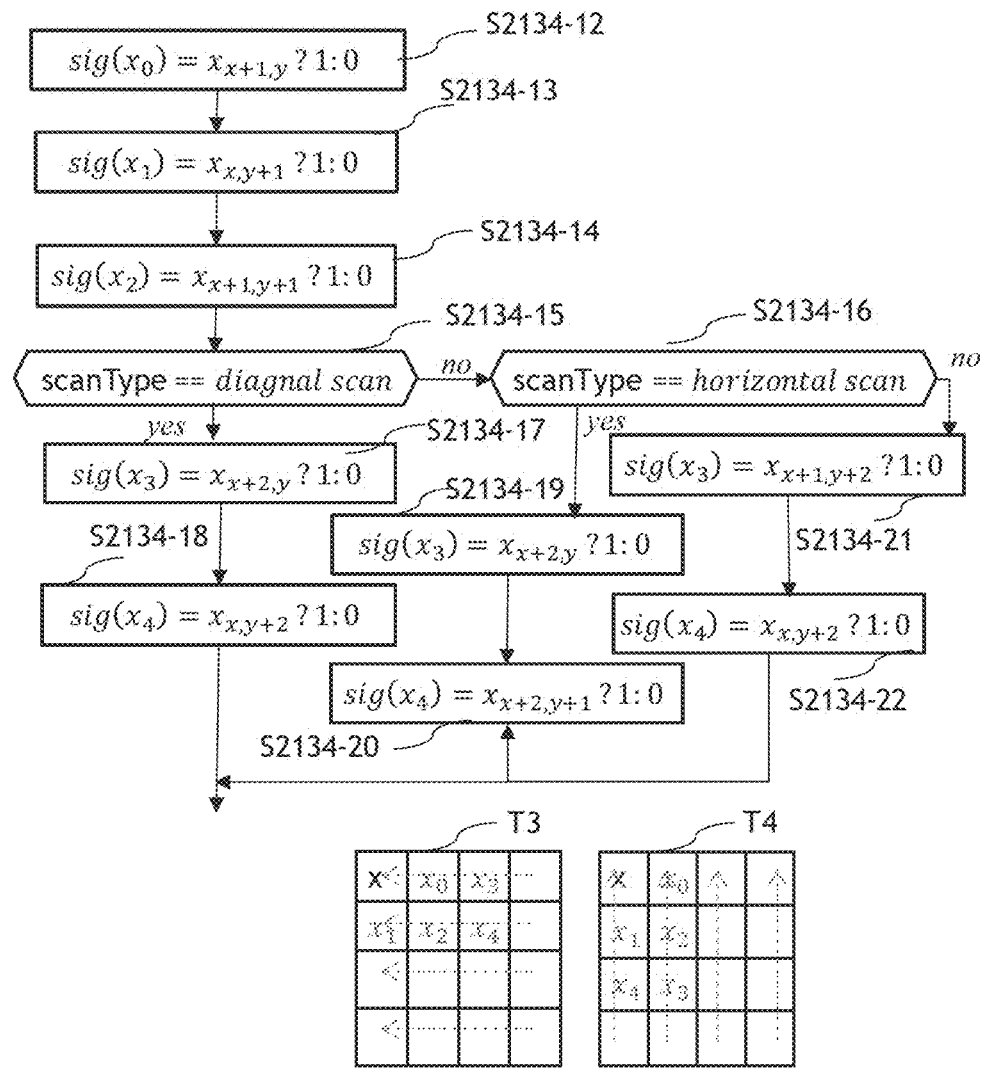
FIG. 16 illustrates the determination of a significant coefficient flag using the new local templates of FIGS. 15A and 15B.

FIG. 16 illustrates the determination of the significant coefficient flag sig($x_i$) to be used in determining $num_{SIG}$ in the new local templates (i.e. T3 or T4) at step S2134 of FIG. 10.

The first three steps (S2134-12, S2134-13 and S2134-14) consist in determining the significance of the first three neighbors of current transform coefficient (x,y). Next, the neighbor positions of current coefficient (x,y) in the local template are selected based on the scanning order (S2134-15). If the scan pattern is the diagonal scan order, the local template of FIG. 12 is used, with the neighbors (x+2, y) and (x, y+2) (S2134-17 and S2134-18). Otherwise, the positions of some neighbors are determined according to the scan pattern (S2134-16).

If the scan pattern is horizontal, the horizontal neighbor with position (x+2, y+1) is selected in the local template in replacement of the one with position (x, x+2) (S2134-20); if the scan pattern is vertical, the vertical neighbor with position (x+1, y+2) is selected in the local template in replacement of the one with position (x+2, y) (S2134-21).

Figure 17:
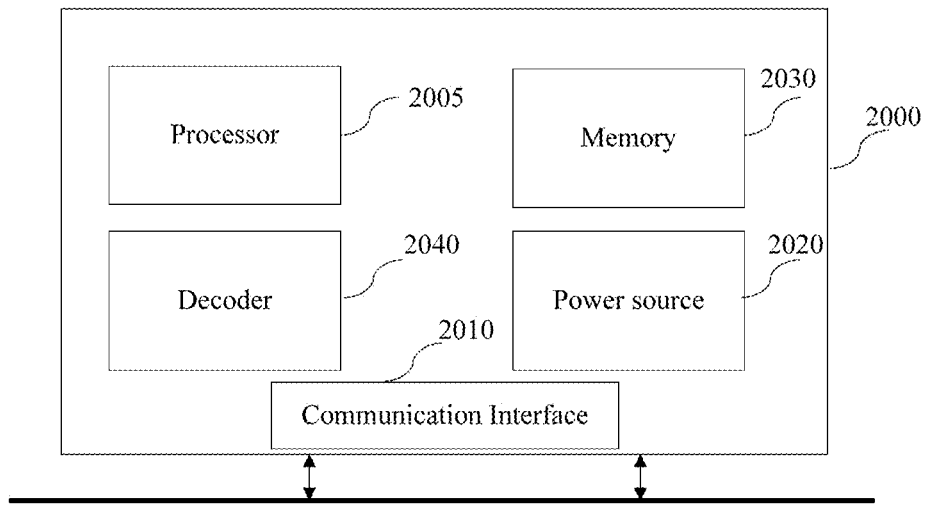
FIG. 17 illustrates an exemplary architecture of a receiver 2000 configured to decode a picture from a bitstream to obtain a decoded picture according to a specific and non-limiting embodiment.

FIG. 17 represents an exemplary architecture of a receiver 2000 configured to decode a picture from a bitstream to obtain a decoded picture according to a specific and non-limiting embodiment.

The receiver 2000 comprises one or more processor(s) 2005, which could comprise, for example, a CPU, a GPU and/or a DSP (English acronym of Digital Signal Processor), along with internal memory 2030 (e.g. RAM. ROM and/or EPROM). The receiver 2000 comprises one or more communication interface(s) 2010 (e.g. a key board, a mouse, a touchpad, a webcam), each adapted to display output information and/or allow a user to enter commands and/or data (e.g. the decoded picture); and a power source 2020 which may be external to the receiver 2000. The receiver 2000 may also comprise one or more network interface(s) (not shown). The decoder module 2040 represents the module that may be included in a device to perform the decoding functions. Additionally, the decoder module 2040 may be implemented as a separate element of the receiver 2000 or may be incorporated within processor(s) 2005 as a combination of hardware and software as known to those skilled in the art.

The bitstream may be obtained from a source. According to different embodiments, the source can be, but is not limited to:

- a local memory, e.g. a video memory, a RAM, a flash memory, a hard disk;
- a storage interface, e.g. an interface with a mass storage, a ROM, an optical disc or a magnetic support.
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the decoded picture may be sent to a destination. e.g. a display device. As an example, the decoded picture is stored in a remote or in a local memory, e.g. a video memory or a RAM, a hard disk. In a variant, the decoded picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 2000 further comprises a computer program stored in the memory 2030. The computer program comprises instructions which, when executed by the receiver 2000, in particular by the processor 2005, enable the receiver to execute the decoding method described with reference to any one of FIGS. 10, 14, 16 and 19-20. According to a variant, the computer program is stored externally to the receiver 2000 on a non-transitory digital data support, e.g. on an external storage medium such as a HDD, CD-ROM, DVD, a read-only and/or DVD drive and/or a DVD Read/Write drive, all known in the art. The receiver 2000 thus comprises a mechanism to read the computer program. Further, the receiver 2000 could access one or more Universal Serial Bus (USB)-type storage devices (e.g., "memory sticks.") through corresponding USB ports (not shown).

According to exemplary and non-limiting embodiments, the receiver 2000 can be, but is not limited to:

- a mobile device;
- a communication device;
- a game device;
- a set top box;
- a TV set;
- a tablet (or tablet computer);
- a laptop;
- a video player, e.g. a Blu-ray player, a DVD player;
- a display; and
- a decoding chip or decoding device/apparatus.

Figure 18:
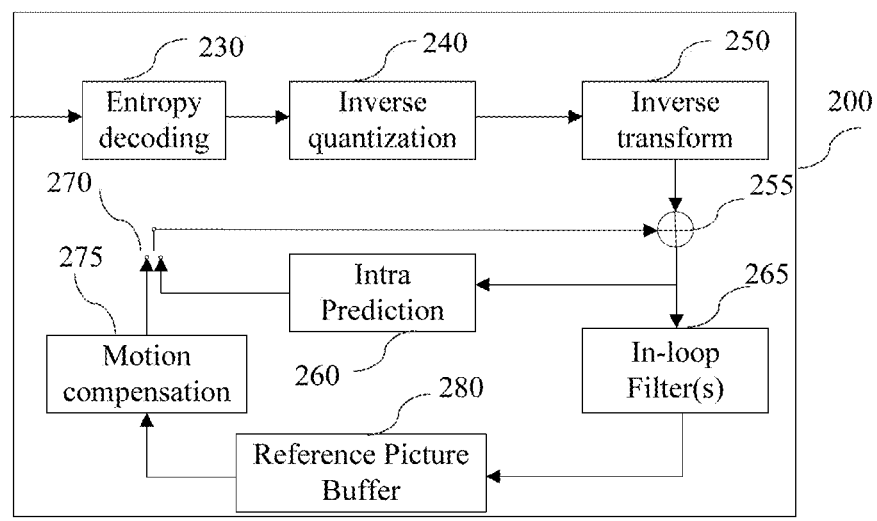
FIG. 18 illustrates a block diagram of an exemplary video decoder adapted to execute the decoding method of any one of FIGS. 10, 14, 16 and 19-20.

FIG. 18 illustrates a block diagram of an exemplary video decoder 200, e.g. an HEVC video decoder, adapted to execute the decoding method of any one of FIGS. 10, 14, 16 and 19-20. The video decoder 200 is an example of a receiver 2000 or part of such a receiver 2000. In the exemplary decoder 200, a bitstream is decoded by the decoder elements as described below. Video decoder 200 generally performs a decoding pass reciprocal to the encoding pass as described in FIG. 2, which performs video decoding as part of encoding video data.

In particular, the input of the decoder includes a video bitstream, which may be generated by the video encoder 100. The bitstream is first entropy decoded (230) to obtain transform coefficients, motion vectors, and other coded information. The transform coefficients are de-quantized (240) and inverse transformed (250) to decode residuals. The decoded residuals are then combined (255) with a predicted sample block (also known as a predictor) to obtain a decoded/reconstructed picture block. The predicted sample block may be obtained (270) from intra prediction (260) or motion-compensated prediction (i.e., inter prediction) (275). As described above, AMVP and merge mode techniques may be used during motion compensation, which may use interpolation filters to calculate interpolated values for sub-integer samples of a reference block. An in-loop filter (265) is applied to the reconstructed picture. The in-loop filter may comprise a deblocking filter and a SAO filter. The filtered picture is stored at a reference picture buffer (280).

Figure 19:
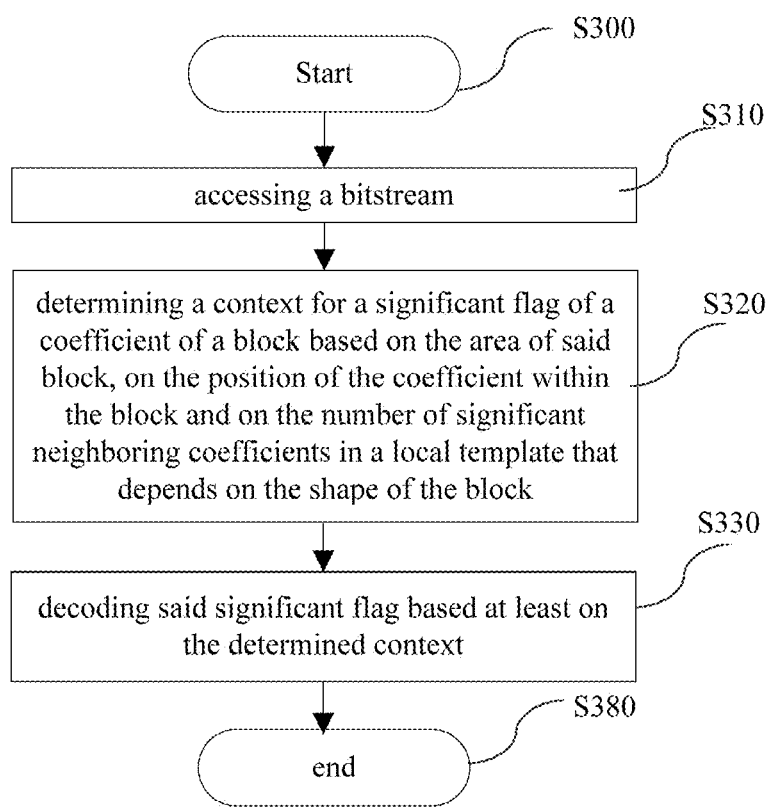
FIG. 19 illustrates a flowchart of a method for decoding a picture from a bitstream according to a specific and non-limiting embodiment.

FIG. 19 represents a flowchart of a method for decoding a picture from a bitstream according to a specific and non-limiting embodiment.

The method starts at step S300. At step S310, a receiver 2000, e.g. such as the decoder 200, accesses a bitstream. At step S320, the receiver determines a context for a significant flag of a coefficient of a block based on the area of the block, on the position of the coefficient within the block and on the number of significant, i.e. non-zero, neighboring coefficients in a local template wherein the local template depends on the shape of said block. At step S330, the receiver decodes the significant flag based on the determined context. The method ends at step S380.

Figure 20:
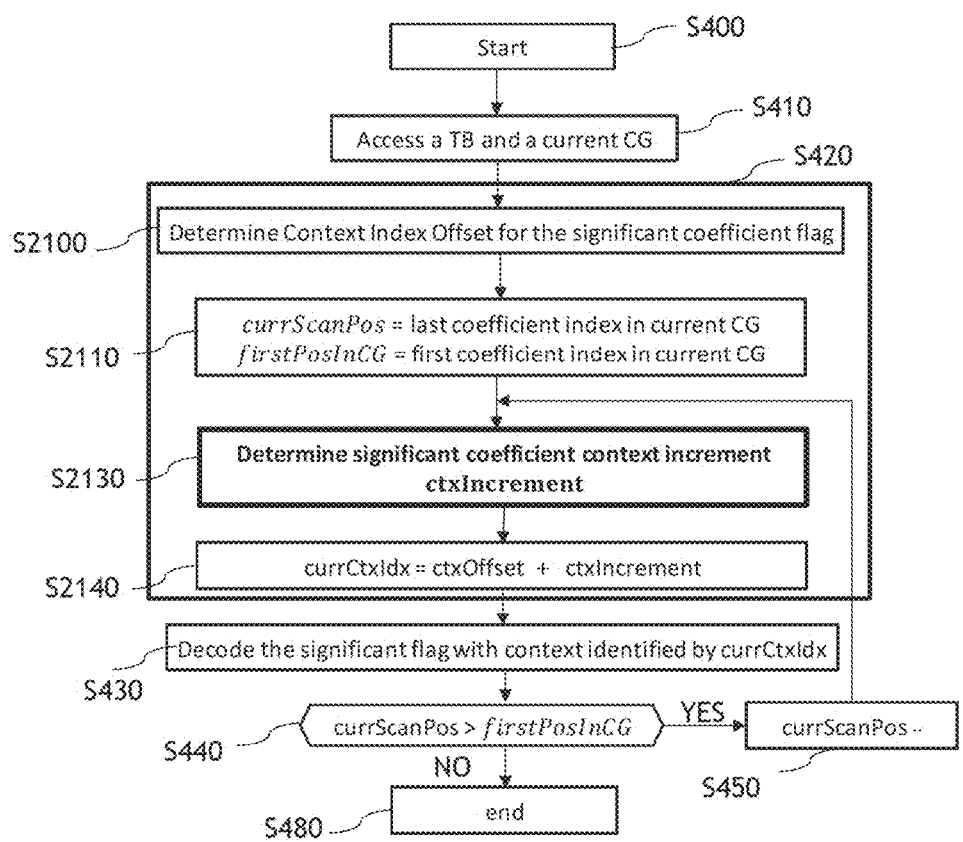
FIG. 20 illustrates a flowchart of an exemplary method for decoding a significant coefficient flag in accordance with a specific and non-limiting embodiment.

FIG. 20 illustrates a flowchart of an exemplary method for decoding a significant coefficient flag in accordance with an embodiment.

The method starts at step S400. At step S410, a receiver 2000, e.g. such as the decoder 200, accesses a TB and a current coding group currCG in the accessed TB. The size of the TB is defined by values width and height.

At step S420, the receiver determines a context for a significant flag of a coefficient of currCG. The step S420, which is similar to the step S220 of FIG. 9, will not be described further. It comprises the steps S2100, S2110, S2130 and S2140.

Once the context index currCtvIdx for the current coefficient (defined by currScanPos) is obtained, its significance bin, represented by variable uiSig is entropy decoded (e.g., CABAC decoded) in step S430 as a function of the context index. In step S440, the process checks whether CurrScanPos is larger than firstPosInCG. If the check in step S440 is true, the process decrements CurrScanPos by I in step S450 and returns to step S2120. If the check in step S440 is false, the method ends in step S480. The method is over once the loop reaches the coefficient with lowest frequency (or DC coefficient) in the current CG, that is, the top left coefficient in FIG. 7, represented by firstPosInCG.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for decoding video data, comprising:
    determining a context for a syntax element associated with a current transform coefficient of a current sub-block of a picture, the current sub-block resulting from a partitioning of a current block of samples according to a split mode selected from a plurality of split modes for splitting a block into at least one of rectangular sub-blocks or square sub-blocks, wherein the context is determined based on a value representative of an area of said current sub-block, a position of the current transform coefficient within the current sub-block, and transform coefficients in a local template, wherein the local template is a subset of transform coefficients of the current sub-block comprising transform coefficients in a causal neighborhood of the current transform coefficient, wherein, a position of at least one of the transform coefficients of the local template with respect to the current transform coefficient depends on a value representative of the shape of the current sub-block resulting from the partitioning of the current block of samples according to the selected split mode; and
    decoding said syntax element based at least on the determined context.

2. The method of claim 1, wherein said syntax element is a significant flag.

3. The method of claim 1, wherein said local template comprises more transform coefficients along a direction of a longest dimension of the current sub-block.

4. The method of claim 1, wherein the transform coefficients of the local template and said current transform coefficient form a horizontal rectangle in the case where the current sub-block is a horizontal rectangle and form a vertical rectangle in the case where the current sub-block is vertical rectangle.

5. The method of claim 1, wherein the position of at least one of the transform coefficients of the local template with respect to the current transform coefficient further depends on a scan order of said current sub-block.

6. The method of claim 5, wherein the transform coefficients of the local template and said current transform coefficient form a horizontal rectangle in the case where said scan order is horizontal and form a vertical rectangle in the case where said scan order is vertical.

7. A non-transitory storage medium carrying a software program including program code instructions for the method according to claim 1.

8. A method for encoding video data, comprising:
    determining a context for a syntax element associated with a current transform coefficient of a current sub-block of a picture, the current sub-block resulting from a partitioning of a current block of samples according to a split mode selected from a plurality of split modes for splitting a block into at least one of rectangular sub-blocks or square sub-blocks, wherein the context is determined based on a value representative of an area of said current sub-block, a position of the current transform coefficient within the current sub-block, and transform coefficients in a local template, wherein the local template is a subset of transform coefficients of the current sub-block comprising transform coefficients in a causal neighborhood of the current transform coefficient, wherein, a position of at least one of the transform coefficients of the local template with respect to the current transform coefficient depends on a value representative of the shape of the current sub-block resulting from the partitioning of the current block of samples according to the selected split mode; and encoding said syntax element based at least on the determined context.

9. The method of claim 8, wherein said syntax element is a significant flag.

10. The method of claim 8, wherein said local template comprises more transform coefficients along a direction of a longest dimension of the current sub-block.

11. The method of claim 8, wherein the transform coefficients of the local template and said current transform coefficient form a horizontal rectangle in the case where the current sub-block is a horizontal rectangle and form a vertical rectangle in the case where the current sub-block is vertical rectangle.

12. The method of claim 8, wherein the position of at least one of the transform coefficients of the local template with respect to the current transform coefficient further depends on a scan order of said current sub-block.

13. The method of claim 12, wherein the transform coefficients of the local template and said current transform coefficient form a horizontal rectangle in the case where said scan order is horizontal and form a vertical rectangle in the case where said scan order is vertical.

14. A non-transitory storage medium carrying a software program including program code instructions for the method according to claim 8.

15. A device for decoding video data, the device comprising electronic circuitry adapted for:

determining a context for a syntax element associated with a current transform coefficient of a current sub-block of a picture, the current sub-block resulting from a partitioning of a current block of samples according to a split mode selected from a plurality of split modes for splitting a block into at least one of rectangular sub-blocks or square sub-blocks, wherein the context is determined based on a value representative of an area of said current sub-block, a position of the current transform coefficient within the current sub-block, and transform coefficients in a local template, wherein the local template is a subset of transform coefficients of the current sub-block comprising transform coefficients in a causal neighborhood of the current transform coefficient, wherein, a position of at least one of the transform coefficients of the local template with respect to the current transform coefficient depends on a value representative of the shape of the current sub-block resulting from the partitioning of the current block of samples according to the selected split mode; and decoding said syntax element based at least on the determined context.

16. The device of claim 15, wherein said syntax element is a significant flag.

17. The device of claim 15, wherein said local template comprises more transform coefficients along a direction of a longest dimension of the current sub-block.

18. The device of claim 15, wherein the transform coefficients of the local template and said current transform coefficient form a horizontal rectangle in the case where the current sub-block is a horizontal rectangle and form a vertical rectangle in the case where the current sub-block is vertical rectangle.

19. The device of claim 15, wherein the position of at least one of the transform coefficients of the local template with respect to the current transform coefficient further depends on a scan order of said current sub-block.

20. The device of claim 19, wherein the transform coefficients of the local template and said current transform coefficient form a horizontal rectangle in the case where said scan order is horizontal and form a vertical rectangle in the case where said scan order is vertical.

21. A device for encoding video data, the device comprising electronic circuitry adapted for:

determining a context for a syntax element associated with a current transform coefficient of a current sub-block of a picture, the current sub-block resulting from a partitioning of a current block of samples according to a split mode selected from a plurality of split modes for splitting a block into at least one of rectangular sub-blocks or square sub-blocks, wherein the context is determined based on a value representative of an area of said current sub-block, a position of the current transform coefficient within the current sub-block, and transform coefficients in a local template, wherein the local template is a subset of transform coefficients of the current sub-block comprising transform coefficients in a causal neighborhood of the current transform coefficient, wherein, a position of at least one of the transform coefficients of the local template with respect to the current transform coefficient depends on a value representative of the shape of the current sub-block resulting from the partitioning of the current block of samples according to the selected split mode; and encoding said syntax element based at least on the determined context.

22. The device of claim 21, wherein said syntax element is a significant flag.

23. The device of claim 21, wherein said local template comprises more transform coefficients along a direction of a longest dimension of the current sub-block.

24. The device of claim 21, wherein the transform coefficients of the local template and said current transform coefficient form a horizontal rectangle in the case where the current sub-block is a horizontal rectangle and form a vertical rectangle in the case where the current sub-block is vertical rectangle.

25. The device of claim 21, wherein the position of at least one of the transform coefficients of the local template with respect to the current transform coefficient further depends on a scan order of said current sub-block.

26. The device of claim 25, wherein the transform coefficients of the local template and said current transform coefficient form a horizontal rectangle in the case where said scan order is horizontal and form a vertical rectangle in the case where said scan order is vertical.

* * * * *